(12) United States Patent
Yazaki et al.

(10) Patent No.: US 8,514,741 B2
(45) Date of Patent: Aug. 20, 2013

(54) PACKET FORWARDING DEVICE

(75) Inventors: Takeki Yazaki, Kawasaki (JP); Mitsuru Nagasaka, Kokubunji (JP)

(73) Assignee: Alaxala Networks Corporation, Kanagawa (JP)

( * ) Notice: Subject to any disclaimer, the term of this patent is extended or adjusted under 35 U.S.C. 154(b) by 135 days.

(21) Appl. No.: 12/414,725

(22) Filed: Mar. 31, 2009

(65) Prior Publication Data
US 2009/0252055 A1 Oct. 8, 2009

(30) Foreign Application Priority Data

Apr. 3, 2008 (JP) ................................. 2008-096695

(51) Int. Cl.
*H04L 12/26* (2006.01)

(52) U.S. Cl.
USPC ........................................................ 370/253

(58) Field of Classification Search
USPC ..................... 370/397, 233, 395.41, 311, 392, 370/237, 229, 401, 253, 395.21, 468, 477
See application file for complete search history.

(56) References Cited

U.S. PATENT DOCUMENTS

| | | | | |
|---|---|---|---|---|
| 5,583,857 A * | 12/1996 | Soumiya et al. | ............. | 370/233 |
| 7,149,222 B2 * | 12/2006 | Wiryaman et al. | ............. | 370/401 |
| 7,266,122 B1 * | 9/2007 | Hogg et al. | ............. | 370/395.41 |
| 2002/0080721 A1 * | 6/2002 | Tobagi et al. | ................ | 370/236 |
| 2006/0176808 A1 * | 8/2006 | Isobe et al. | ..................... | 370/229 |
| 2007/0201461 A1 | 8/2007 | Shinohara et al. | | |
| 2008/0232386 A1 * | 9/2008 | Gorti et al. | ..................... | 370/412 |
| 2009/0010267 A1 * | 1/2009 | Lin et al. | ........................ | 370/397 |
| 2009/0067328 A1 * | 3/2009 | Morris et al. | ............. | 370/230.1 |
| 2009/0067356 A1 * | 3/2009 | Sakamoto et al. | ............ | 370/311 |
| 2009/0180477 A1 * | 7/2009 | Akahane | ....................... | 370/392 |
| 2009/0323707 A1 * | 12/2009 | Aimoto | ......................... | 370/401 |
| 2011/0096667 A1 * | 4/2011 | Arita et al. | .................... | 370/237 |

FOREIGN PATENT DOCUMENTS

| | | |
|---|---|---|
| JP | 11-88458 A | 3/1999 |
| JP | 11-234344 A | 8/1999 |
| JP | 2007-228491 A | 9/2007 |

* cited by examiner

*Primary Examiner* — Kwang B Yao
*Assistant Examiner* — Syed M Bokhari
(74) *Attorney, Agent, or Firm* — Mattingly & Malur, PC

(57) ABSTRACT

A packet forwarding device changes packet transfer performance according to a packet load, and ensures communication quality of an important packet while transfer performance is made minimum to suppress power consumption. The packet forwarding device includes a measuring section to measure the packet load for each packet importance degree, an estimation section to estimate a future packet load for each importance degree based on the measurement result, a performance determination section to determine performance for an operation based on the estimated load, which are provided in, for example, a traffic estimation/performance determination section. Reduction in the power consumption and assurance of the communication quality of the important packet are realized by a minimum performance determination based on an important packet estimation load in the performance determination section and a preferential process of the important packet in the packet forwarding device.

16 Claims, 20 Drawing Sheets

CAM FOR FLOW TABLE 1700

| ADDRESS | | | | | | | | | |
|---|---|---|---|---|---|---|---|---|---|
| 1 | SIP1 | DIP1 | SPORT1 | DPORT1 | DSCP1 | SMAC1 | DMAC1 | UPRI1 | 1710-1 |
| 2 | SIP2 | DIP2 | SPORT2 | DPORT2 | DSCP2 | SMAC2 | DMAC2 | UPRI2 | 1710-2 |
| 3 | SIP3 | DIP3 | SPORT3 | DPORT3 | DSCP3 | SMAC3 | DMAC3 | UPRI3 | 1710-3 |
| 4 | SIP4 | DIP4 | SPORT4 | DPORT4 | DSCP4 | SMAC4 | DMAC4 | UPRI4 | 1710-4 |
| 5 | SIP5 | DIP5 | SPORT5 | DPORT5 | DSCP5 | SMAC5 | DMAC5 | UPRI5 | 1710-5 |
| 6 | SIP6 | DIP6 | SPORT6 | DPORT6 | DSCP6 | SMAC6 | DMAC6 | UPRI6 | 1710-6 |
| 7 | SIP7 | DIP7 | SPORT7 | DPORT7 | DSCP7 | SMAC7 | DMAC7 | UPRI7 | 1710-7 |
| ⋮ | | | | | | | | | |
| n | SIPn | DIPn | SPORTn | DPORTn | DSCPn | SMACn | DMACn | UPRIn | 1710-n |

FIG.17

MEMORY FOR FLOW TABLE 800

| ADDRESS | FILTER INFORMATION | QoS INFORMATION | COUNTER | |
|---|---|---|---|---|
| 1 | FILTER INFORMATION 1 | QoS INFORMATION 1 | COUNTER 1 | 1810-1 |
| 2 | FILTER INFORMATION 2 | QoS INFORMATION 2 | COUNTER 2 | 1810-2 |
| 3 | FILTER INFORMATION 3 | QoS INFORMATION 3 | COUNTER 3 | 1810-3 |
| 4 | FILTER INFORMATION 4 | QoS INFORMATION 4 | COUNTER 4 | 1810-4 |
| 5 | FILTER INFORMATION 5 | QoS INFORMATION 5 | COUNTER 5 | 1810-5 |
| 6 | FILTER INFORMATION 6 | QoS INFORMATION 6 | COUNTER 6 | 1810-6 |
| 7 | FILTER INFORMATION 7 | QoS INFORMATION 7 | COUNTER 7 | 1810-7 |
| ⋮ | | | | |
| n | FILTER INFORMATION n | QoS INFORMATION n | COUNTER n | 1810-n |

FIG.18

MEASUREMENT TABLE 400

| Address | Col 1 | Col 2 | | |
|---|---|---|---|---|
| 1 | BYTE COUNT 1 | PACKET COUNT 1 | ←---- 410-1 FOR IMPORTANT PACKET | FOR INPUT LINE 201-11 |
| 2 | BYTE COUNT 2 | PACKET COUNT 2 | ←---- 410-2 FOR UNIMPORTANT PACKET | |
| 3 | BYTE COUNT 3 | PACKET COUNT 3 | ←---- 410-3 FOR IMPORTANT PACKET | FOR INPUT LINE 201-12 |
| 4 | BYTE COUNT 4 | PACKET COUNT 4 | ←---- 410-4 FOR UNIMPORTANT PACKET | |
| 5 | BYTE COUNT 5 | PACKET COUNT 5 | ←---- 410-5 FOR IMPORTANT PACKET | FOR INPUT LINE 201-13 |
| 6 | BYTE COUNT 6 | PACKET COUNT 6 | ←---- 410-6 FOR UNIMPORTANT PACKET | |
| 7 | BYTE COUNT 7 | PACKET COUNT 7 | ←---- 410-7 FOR IMPORTANT PACKET | FOR INPUT LINE 201-14 |
| 8 | BYTE COUNT 8 | PACKET COUNT 8 | ←---- 410-8 FOR UNIMPORTANT PACKET | |

FIG.20

PACKET FORWARDING DEVICE

CLAIM OF PRIORITY

The present application claims priority from Japanese patent application JP 2008-096695 filed on Apr. 3, 2008, the content of which is hereby incorporated by reference into this application.

BACKGROUND OF THE INVENTION

1. Field of the Invention

The present invention relates to a packet forwarding device, and particularly to a packet forwarding device for transferring a packet in a power saving manner.

2. Description of the Related Art

Under the background of the popularization of the Internet, speed-up of a packet forwarding device, such as a router or a switch, is demanded. The router or the switch includes plural input lines and output lines, and when a packet is inputted from the input line, the router or the switch determines the output line from the destination address in the header (this process is called an output destination determination process in this application), and transfers the packet to the output line. Further, the router or the switch performs a filtering process in which a flow as a series of packets, to which the packet belongs, is identified from the header, and passing/discarding of the packet is determined for each flow, and a determination process of priority in a network (this process is called a flow process in this application).

In order to increase the speed of the packet forwarding device, it becomes necessary to increase the number of devices such as an application specific integrated circuit (ASIC), or to raise the frequency thereof. Thus, when the speed of the router or the switch is increased, the power consumption thereof is increased. Accordingly, it is required that the power consumption be reduced and the increase of power due to the speed-up be made minimum.

A realization system of reducing the power consumption of a packet forwarding device is disclosed in, for example, patent document 1. The packet forwarding device of the document monitors the presence or absence of link connection of included plural lines, and the power source of a port control circuit to perform a packet process is turned ON when the link connection exists. The power source of a port control circuit which is not required to perform a process is turned OFF, so that the power consumption of the packet forwarding device is reduced.

Another realization method of reducing the power consumption of a packet forwarding device is disclosed in, for example, patent document 2. The packet forwarding device of the document includes plural interface ports to accommodate lines, an access state monitor section to monitor access states of the interface ports, and a power source control section to determine whether power is applied to the respective interface ports according to the monitor state of the access state monitor section. The power source of the interface port in which there is no access is turned OFF, so that the reduction in power consumption can be realized.

Another realization means for reducing power consumption in a packet forwarding device is disclosed in patent document 3. This document discloses that a high clock operation and a low clock operation are automatically changed according to an actual process load of a packet forwarding process and an estimated process load. As compared with a prior art packet forwarding device in which a high clock operation is performed even at the time of low load, the clock is reduced at the time of the low load, so that the reduction in power consumption can be realized.

[Patent document 1] JP-A-11-88458
[Patent document 2] JP-A-11-234344
[Patent document 3] JP-A-2007-228491

SUMMARY OF THE INVENTION

In the packet forwarding device of the patent document 1 or 2, consideration is given to a case where communication is performed using the port circuit control section or part of the bandwidth of the lines accommodated in the interface ports. At this time, in order to perform the process of the input packet, the power source of the port circuit control section or the interface port must always be turned ON. Consequently, more power than is necessary to maintain the performance is supplied to the port circuit control section or the interface port, and there is a problem that wasteful power is consumed.

On the other hand, in the patent document 3, it is conceivable that the wasteful power can be reduced by performing the low clock operation when the communication is performed using part of the bandwidth. However, there is the following problem.

When the clock operation is switched based on the actual process load, in general, it takes a certain time to switch the clock operation. Thus, when switching to the high clock operation is performed at the time point when the actual load becomes high, there is a possibility that packet processing performance is insufficient and packets are discarded. Packets include a packet which is not to be discarded and requires communication with low delay (hereinafter referred to as an important packet), and a packet which may be discarded or delayed (hereinafter referred to as an unimportant packet). There is a possibility that the foregoing discarded packets include the important packet, and there is a problem that the packet forwarding device of the patent document 3 may discard the important packet.

When the clock operation is switched based on the estimated process load, in order to prevent the discard of packets, in general, it is necessary that a maximum value of an estimated process load (total load of important packets and of unimportant packets) is obtained, and the clock operation is made to correspond to the value. At this time, when an abrupt load increase is expected, the estimated process load becomes remarkably larger than the actual load, and there is a problem that wasteful power is consumed.

The present invention is made to solve these matters, and has an object to provide a packet forwarding device which realizes low power consumption by lowering packet processing performance according to a process load, and in which the packet processing performance is suppressed to be low while the discard of an important packet is prevented, and further power saving is realized.

In order to solve the problems, according to an aspect of the invention, in a packet forwarding device which includes plural input lines and plural output lines and in which when a packet is inputted from the input line, the packet is transferred to one or more of the output lines, the packet forwarding device includes:

a packet transfer processing section to transfer a packet; an importance degree determination section to determine an importance degree of the packet from header information of the packet; a measuring section to measure an amount of packets reaching the packet transfer processing section for each packet importance degree; and a performance determination section to determine packet processing performance of the packet transfer processing section based on the measured amount of packets for each importance degree.

Matters, other than the above, that are to be solved by the invention, and the solving means will be apparent from the description of embodiments described later in detail and the drawings.

According to the solving means of this invention, there is provided a packet forwarding device which comprises a plurality of input lines and a plurality of output lines, and transfers a packet inputted from the input line to one or more of the output lines, the packet forwarding device comprising:

a packet transfer processing section to transfer the packet;

an importance degree determination section to determine an importance degree of the packet from header information of the packet;

a measuring section to measure an amount of packets reaching the packet transfer processing section for each packet importance degree; and a performance determination section to determine packet processing performance to be required of the packet transfer processing section based on the measured amount of packets for each importance degree and to change processing performance of the packet transfer processing section according to the determined packet processing performance.

According to the present invention, it is possible to provide a packet forwarding device which realizes low power consumption by lowering packet processing performance according to a process load, and in which the packet processing performance is suppressed to be low while the discard of an important packet is prevented, and further power saving is realized.

In the technique disclosed in the patent document 3, since it is necessary to determine the processing performance based on the estimated total packet amount (process load), it is necessary that a value not smaller than the maximum value of the total packet amount is determined to be the packet processing performance. On the other hand, according to the invention, the performance determination section of the packet forwarding device can determine the packet processing performance based on the packet amount (process load) estimated for each importance degree, and it can be determined to be appropriate that in order to ensure the communication quality of the important packet, the packet processing performance is made a value not smaller than the maximum value of the important packet. Besides, when the determination section determines that the packet processing performance is not smaller than the maximum value of the important packet and smaller than the maximum value of the total packet amount, the packet forwarding device of the invention ensures the communication quality of the important packet, and can realize low power consumption as compared with the packet forwarding device disclosed in the patent document 3.

DESCRIPTION OF THE DRAWINGS

FIG. 17 is a view showing a format of a CAM for flow table.

FIG. 18 is a view showing a format of a memory for flow table.

FIG. 20 is a view showing a format of a measurement table.

DETAILED DESCRIPTION OF THE INVENTION

Hereinafter, an embodiment of the invention will be described with reference to the drawings.

Figure 2:
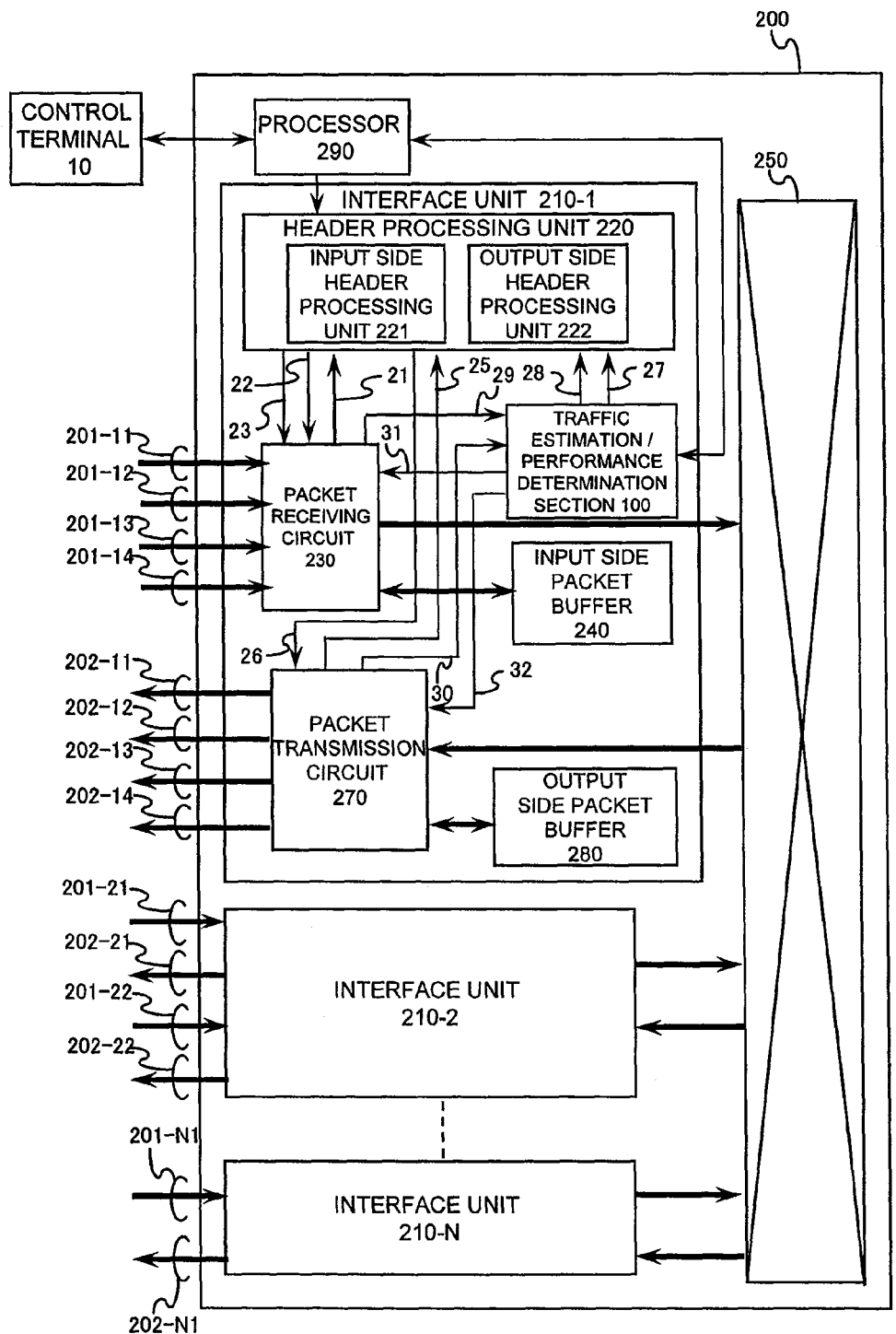
FIG. 2 is a view showing the whole structure of a packet forwarding device.

A rough operation of a packet forwarding device of an embodiment will be described with reference to FIG. 2 to FIG. 7. FIG. 2 is a block diagram of a packet forwarding device 200.

The packet forwarding device 200 includes N interface units 210-$i$ ($i=1$ to N), M input lines 201-$ij$ ($i=1$ to N) ($j=1$ to M) accommodated in the interface units 210-$i$, M output lines 202-$ij$ ($i=1$ to N) ($j=1$ to M), a packet forwarding unit 250 to couple the interface units 210-$i$, and a processor 290. The processor 290 is connected to an outside control terminal 10, and sends instructions of the control terminal 10 to the interface units 210-$i$ or sends the information of the interface units 210-$i$ to the control terminal 10.

The interface unit 210-1 of the packet forwarding device 200 of FIG. 2 accommodates the input lines 201-11, 201-12, 201-13 and 201-14, and the output lines 202-11, 202-12, 202-13 and 202-14. The interface unit 210-2 accommodates the input lines 201-21 and 201-22 and the output lines 202-21 and 202-22, and the interface unit 210-N accommodates the input line 201-N1 and the output line 202-N1.

The interface unit 210-1 includes a packet receiving circuit 230 to perform a packet reception process, an input side packet buffer (PB) 240, a packet transmission circuit 270 to perform a packet transmission process, an output side packet buffer (PB) 280, a header processing unit 220, and a traffic estimation/performance determination section 100.

Figure 3:
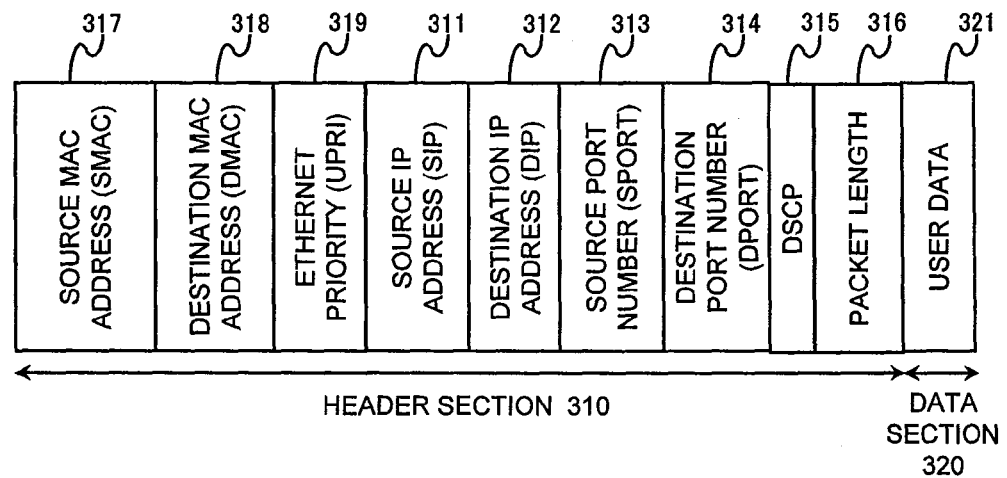
FIG. 3 is a view showing a format of a packet transmitted or received by the packet forwarding device.

FIG. 3 shows an example of a format of a packet inputted from an input line 201-$ij$ and outputted to an output line 202-$ij$ of FIG. 2.

The format of the packet includes a header section 310 and a data section 320. The header section 310 includes a source IP address (hereinafter referred to as SIP) 311 as a transmission source address (address of a transmission terminal) of a network layer, a destination IP address (hereinafter referred to as DIP) 312 as a destination address (address of a reception terminal), a source port number (hereinafter referred to as SPORT) 313 to represent a protocol (=higher application), a destination port number (hereinafter referred to as DPORT) 314, a differentiated services code point (DSCP) 315 to represent transfer priority of the network layer, a packet length 316, a source MAC address (hereinafter referred to as SMAC) 317 as a transmission source address of a data link layer, a destination MAC address (hereinafter referred to as DMAC) 318 as a destination address, and a Ethernet priority (hereinafter referred to as UPRI) 319 to represent transfer priority of the data link layer. The data section 320 includes a user data 321.

Figure 4:
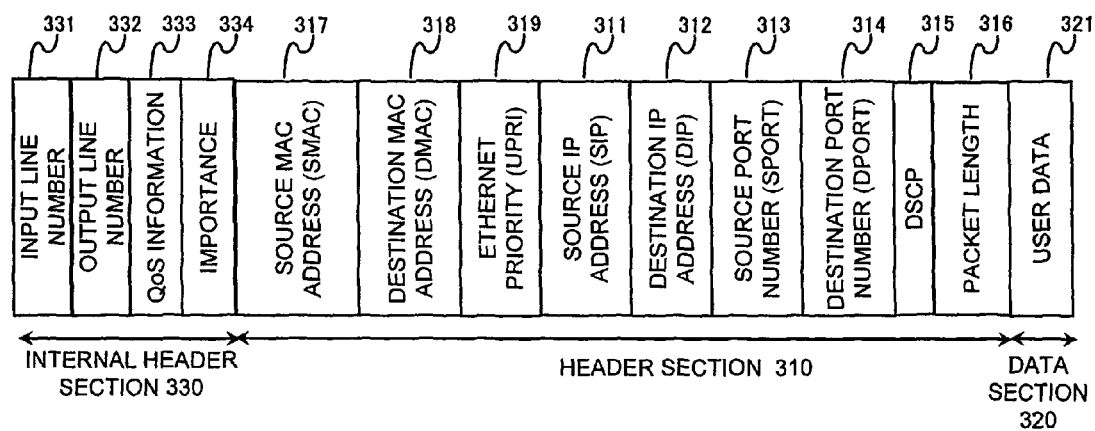
FIG. 4 is a view showing a format of a packet in the packet forwarding device.

FIG. 4 shows an example of a packet format in the packet forwarding device (node) 200 of FIG. 2.

The format further includes an internal header section 330 in addition to the foregoing format. The internal header section 330 includes an input line number 331 as an identification number of an input line 201-*ij* to which a packet is inputted, an output line number 332 as an identification number of an output line 202-*ij* from which the packet is outputted, a QoS information 333 to represent transmission priority of the packet, and an importance 334 to represent importance of the packet and to indicate priority of a process in the transfer apparatus 200.

Figure 5:
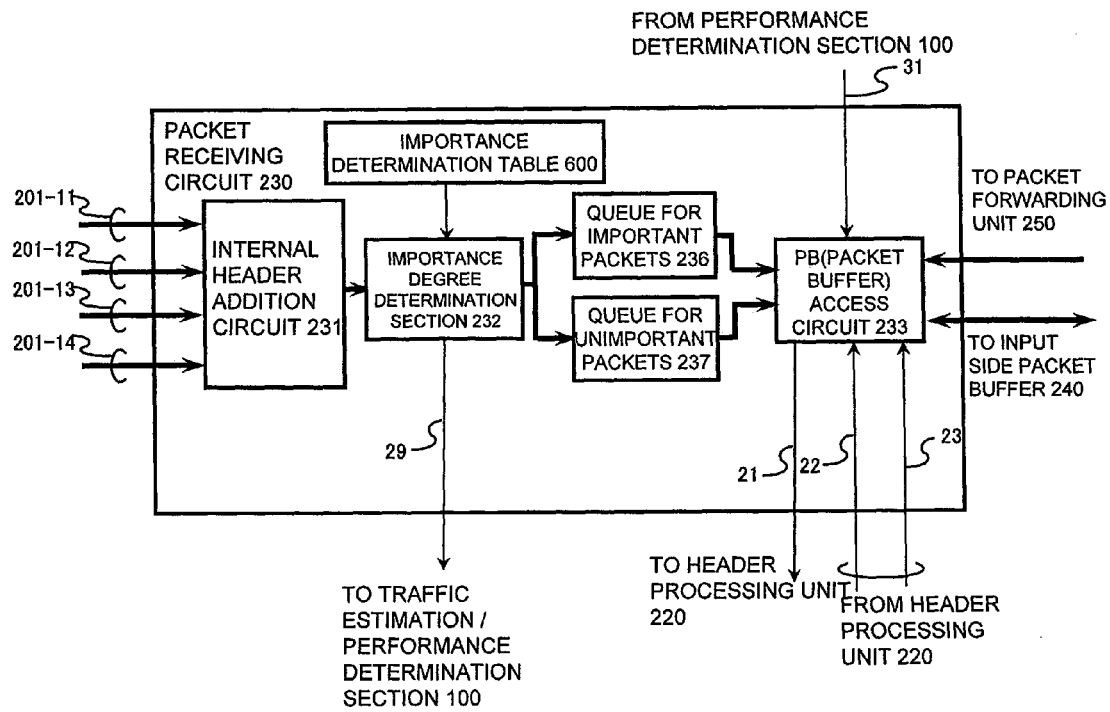
FIG. 5 is a view showing a structure of a packet reception circuit.

FIG. 5 is a structural view of the packet receiving circuit 230.

When a packet is inputted from the input line 201-*ij*, the packet receiving circuit 230 of FIG. 2 receives the packet. First, an internal header addition circuit 231 of the packet receiving circuit 230 adds the internal header section 330 including the input line number and transmits the packet to an importance degree determination section 232.

Figure 7:
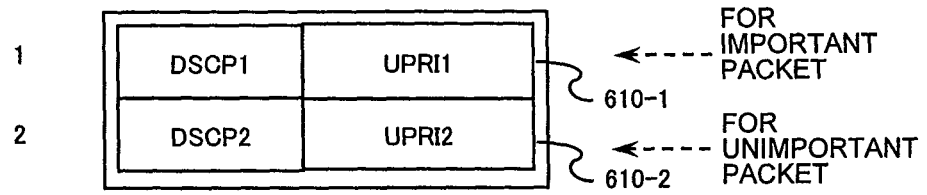
FIG. 7 is a view showing a format of an importance determination table.

When receiving the packet, the importance degree determination section 232 reads an importance determination table 600. FIG. 7 shows an example of the table 600. The table 600 includes an entry 610 in which a packet condition is written for each importance degree. In the example of the table 600 of FIG. 7, two importance degrees of importance and unimportance are defined as the importance degrees, and the DSCP 315 and the UPRI 319 of the header section 310 are written as the determination condition. The importance degree determination section 232 compares the DSCP 315 and the UPRI 319 in the header information 21 of the inputted packet with the read values of the entry 610. The importance degree determination section 232 writes the importance corresponding to the coincident entry 610 into the importance 334 of the internal header section 330, and transmits, as packet length information 29, the packet length 316 of the header section 310, the input line number 331 and the output line number 332 of the internal header section 330 to the traffic estimation/performance determination section 100. Incidentally, in the packet receiving circuit 230, the output line number 332 does not contain data yet.

The packet receiving circuit 230 includes a queue 236 for important packets and a queue 237 for unimportant packets, and the importance degree determination section 232 transmits the packet to the queue corresponding to the determined importance degree.

When a packet exists in the queue 236 for important packets, a PB (Packet Buffer) access circuit 233 reads the packet from the queue 236 and writes the packet into the input side packet buffer 240. On the other hand, when a packet does not exist in the queue 236, the PB access circuit 233 reads a packet from the queue 237 for unimportant packets and writes it into the buffer 240.

The PB access circuit 233 operates at a performance based on after-mentioned performance information 31 transmitted by the traffic estimation/performance determination section 100. When the value of the information is smaller than the bandwidth of the packet inputted from the input line 201-*ij*, the reached packet is discarded. The queues 236 and 237 are buffers provided to prevent the packet from being discard as stated above. However, when the state in which the bandwidth of the input packet is smaller than the writing bandwidth continues for a long period, the queue overflows, and the packet discard or delay occurs. Thus, in order to prevent the packet discard or delay of an important packet, the PB access circuit 233 writes the packet of the queue 236 for important packets preferentially into the input side packet buffer 240.

The PB access circuit 233 manages the sequence in which the packets are stored for each importance degree, reads the header section 310 and the input line number 331 of the packet which has a higher importance degree and is earliest in the sequence, and transmits them as the header information 21 to the header processing unit 220.

An input side header processing unit 221 in the header processing unit 220 performs an output destination determination process to determine an output line number of an input packet based on the SIP 311, the DIP 312, the SPORT 313, the DPORT 314, the DSCP 315, the SMAC 317, the DMAC 318 and the UPRI 319 in the header information 21, and a flow process to determine a flow to which the packet belongs, to determine filter information of the flow and QoS information, and to count the input packet for each flow. Thereafter, the input side header processing unit 221 transmits output line information 22 including the determined output line number and flow information 23 including the filter information and the QoS information to the packet receiving circuit 230.

The input side header processing unit 221 operates at the performance based on after-mentioned packet performance information 27. In preparation for the case where the input of the header information 21 becomes higher than the performance of the input side header processing unit 221, the input side header processing unit 221 includes a queue for each importance degree, reads the header information 21 of the queue for important packets preferentially, and performs an output destination determination process and a flow process. The preferential process of the important packet is performed, so that it is prevented that a lot of header information 21 is stored in the queue for important packets, and the communication quality of the important packet is ensured. The detailed operation of the input side header processing unit 221 will be described later.

When the filter information in the flow information 23 is "transfer", the PB access circuit 233 of the packet receiving circuit 230 writes the output line number in the output line information 22 and the QoS information in the flow information 23 into the fields of the output line number 332 and the QoS information 333 of the packet stored in the input side packet buffer 240. The input side packet buffer 240 manages the sequence of the packet in which the output line number 332 and the QoS information 333 are written for each importance degree. In order to ensure the communication quality of the important packet, among packets having a higher importance degree, the packet earliest in the writing sequence is read and is transmitted to the packet forwarding unit 250. On the other hand, when the filter information in the flow information 23 is "discard", the stored packet is discarded.

The packet forwarding unit 250 which received the packet transmits the received packet to the packet transmission circuit 270 of the interface unit 210-*i* corresponding to the output line number 332.

In parallel to the output destination determination process and the flow process, the traffic estimation/performance determination section 100 measures, based on the packet length information 29, a bandwidth (bps: bits per sec) as the number of bits per second of a packet inputted from the input line 201-*ij* and a packet rate (pps: packets per sec) as the number of packets per second, and estimates a future bandwidth and a future packet rate based on the measured bandwidth and the packet rate. Further, the traffic estimation/performance determination section 100 determines, from these estimated values, the packet performance (pps) of the input side header processing unit 221 and the performance (bps) of the packet receiving circuit 230. The traffic estimation/performance determination section 100 transmits the determined packet performance (bps) as the packet performance information 27 to the header processing unit 220, and transmits the determined performance (bps) as the performance information 31 to the packet receiving circuit 230.

The input side header processing unit 221 which received the packet performance information 27 changes the performance of the output destination process or the flow process in accordance with the received information 27. On the other hand, the PB access circuit 233 of the packet receiving circuit 230 which received the performance information 31 changes the operation clock of the PB access circuit in accordance with the performance information 31. For example, consideration is given to a case where, when the PB access circuit operates at an operation clock of 100 Mhz, a packet inputted from the input line 201-*ij* is written at 10 Gbps into the input side packet buffer 240 and can be read to the packet forwarding unit 250. At this time, when the performance determination section 100 issues a performance instruction of 4.5 Gbps, the PB access circuit 233 operates at, for example, 45 Mhz. The performance change method of the input side header processing unit 221 can also be performed similarly. For example, in the case where the output destination process and the flow process can be performed at 15 Mpps when the input side header processing unit 221 operates at an operation clock of 100 Mhz, when the performance determination section 100 issues a performance instruction of 12 Mbps, it operates at, for example, 80 Mhz. Incidentally, another performance change method of the input side header processing unit 221 will be described later.

Figure 6:
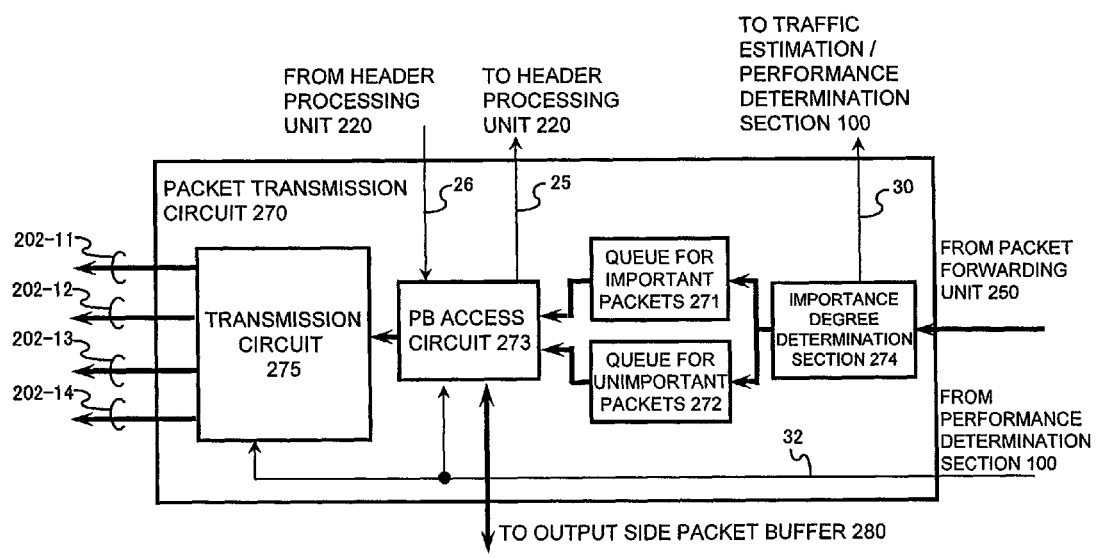
FIG. 6 is a view showing a structure of a packet transmission circuit.

FIG. 6 is a structural view of the packet transmission circuit 270 which receives a packet transmitted by the packet forwarding unit 250 and transmits the packet to the output line 202-*ij*.

The packet transmission circuit 270 includes, for example, an importance degree determination section 274, queues 271 and 272 for each importance degree, a packet buffer (PB) access circuit 273 and a transmission circuit 275.

When receiving a packet from the packet forwarding unit 250, the importance degree determination section 274 refers to the importance 334 in the internal header section 330, and transmits the packet to the corresponding queue (the queue 271 or the queue 272). Also, the importance degree determination section 274 transmits the packet length 316 of the header section 310 and the output line number 332, as packet length information 30, to the traffic estimation/performance determination section 100. Also, the respective queues store the received packets.

The PB access circuit 273 reads the packet of the queue 271 for important packets preferentially and writes it into the output side packet buffer 280. In a case where the bandwidth of the packet inputted from the packet forwarding unit 250 is higher than the bandwidth written in the output side packet buffer 280, the queues 271 and 272 at once store the packets and prevent the packet discard. Further, the PB access circuit 273 processes the important packet preferentially, and the performance of the circuit 273 is preferentially assigned to the important packet.

The PB access circuit 273 manages the sequence in which the packets are stored in the output side packet buffer 280 for each importance degree, reads all information of the header section 310 and the output line number 332 of the packet first stored in the output side packet buffer 280, and transmits them as header information 25 to the header processing unit 220.

An output side header processing unit 222 of the header processing unit 220 performs a flow process to detect a flow to which the input packet belongs based on the SIP 311, the DIP 312, the SPORT 313, the DPORT 314, the DSCP 315, the SMAC 317, the DMAC 318 and the UPRI 319 in the header information 25, to determine filter information and QoS information, and to count the input packet for each flow. Thereafter, the output side header processing unit 222 transmits flow information 26 including the determined filter information and QoS information to the packet transmission circuit 270. In preparation for the case where the input of the header information 25 becomes higher than the performance of the output side header processing unit 222, the output side header processing unit 222 includes a queue for each importance degree, and preferentially performs the flow process on the queue for important packets. The preferential process of the important packet is performed, so that it is prevented that a lot of header information 25 is stored in the queue for important packets, and the communication quality of the important packet is ensured. The detailed operation of the output side header processing unit 222 will be described later.

When the filter information in the flow information 26 is "transfer", the PB access circuit 273 writes the QoS information in the flow information 26 into the field of the QoS information 333 of the packet stored in the output side packet buffer 280. On the other hand, when the filter information in the flow information 26 is "discard", the PB access circuit 273 discards the stored packet. Further, the PB access circuit 273 manages, for each importance degree, the writing sequence of the packet in which the writing of the QoS information of the flow information 26 is ended, reads the packet having a higher importance degree and earliest in the sequence from the output side packet buffer 280 and transmits it to the transmission circuit 275. The transmission circuit 275 transmits the packet to the output line 202-*ij* corresponding to the value written in the field of the output line number 332 of the packet.

In parallel to this flow process, the traffic estimation/performance determination section 100 measures the bandwidth (bps) of the packet inputted from the packet forwarding unit 250 and the packet rate (pps) based on the packet length information 30, and estimates a future bandwidth and packet rate based on the measured bandwidth and packet rate. Further, the packet performance (pps) of the output side header processing unit 222 and the performance (bps) of the packet transmission circuit 270 are determined from these estimated values, the determined packet performance (pps) is transmitted as packet performance information 28 to the header processing unit 220, and the determined performance (bps) is transmitted as performance information 32 to the packet transmission circuit 270.

The output side header processing unit 222 which received the packet performance information 28 changes the performance of the flow process in accordance with the received information 28. The change of the performance by the change of the clock frequency is the same as that of the input side header processing unit 221. Incidentally, the details of another performance change method of the output side header processing unit 222 will be described later. On the other hand, the PB access circuit 273 and the transmission circuit 275 of the packet transmission circuit 270 which received the performance information 32 adjusts the clock frequency according to the information 32.

Figure 1:
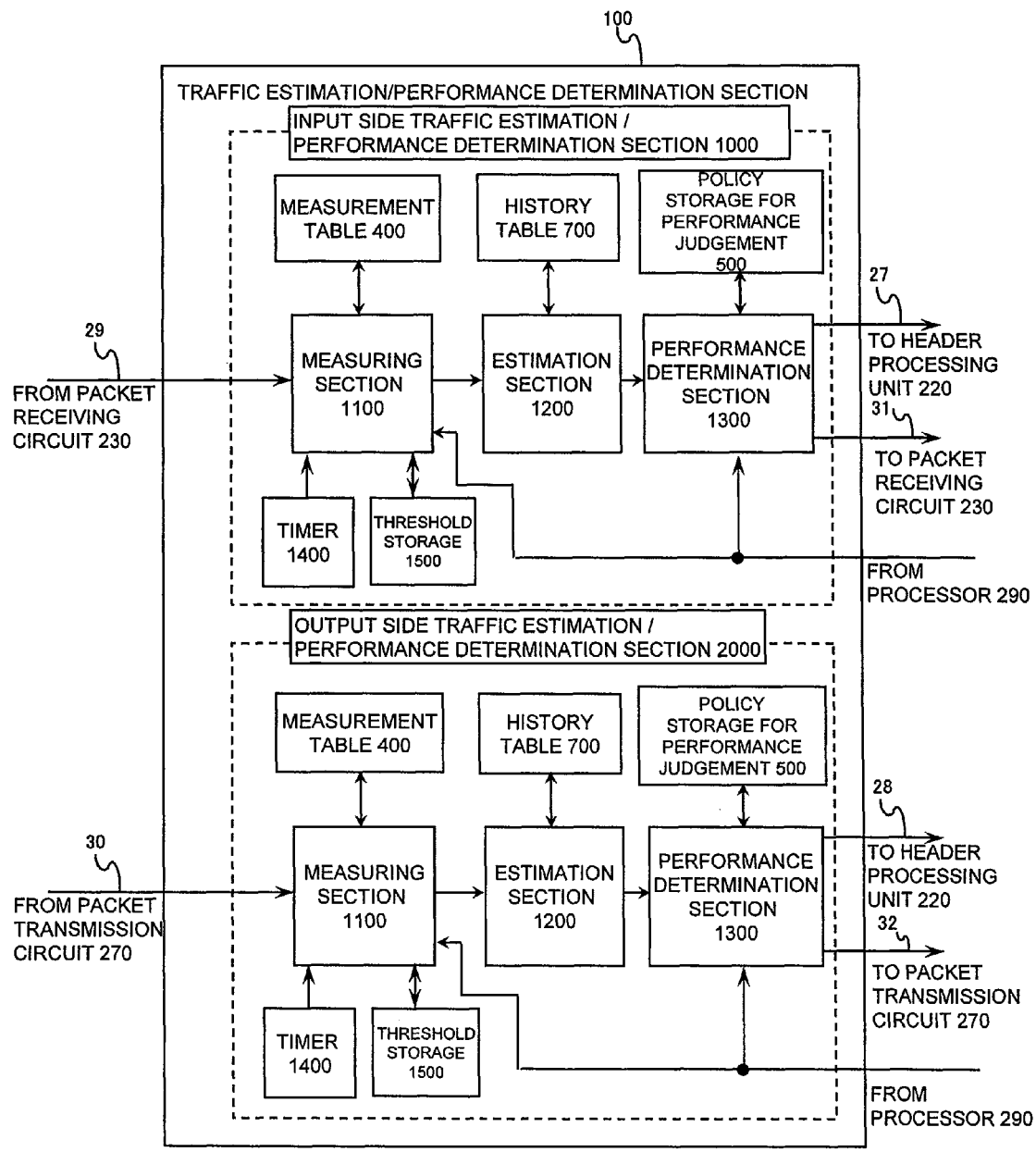
FIG. 1 is a view showing a structure of a traffic estimation/performance determination section of the invention.

FIG. 1 is a structural view of the traffic estimation/performance determination section 100. Next, the details of the traffic estimation/performance determination section 100 will be described with reference to FIG. 1.

The traffic estimation/performance determination section 100 includes an input side traffic estimation/performance determination section 1000 and an output side traffic estimation/performance determination section 2000. The input side traffic estimation/performance determination section 1000 determines the performance of the packet receiving circuit 230 and the input side header processing unit 221, and sends the determined performance to the packet receiving circuit 230 and the input side header processing unit 221. On the other hand, the output side traffic estimation/performance determination section 2000 determines the performance of the packet transmission circuit 270 and the output side header processing unit 222, and sends the determined performance to the packet transmission circuit 270 and the output side header processing unit 222.

The input side traffic estimation/performance determination section 1000 includes, for example, a measuring section 1100 to measure the bandwidth (bps) of a packet received by the packet receiving circuit 230 and the packet rate (pps) based on the packet length information 29 and according to an importance degree, a measurement table 400, a timer 1400, a threshold storage 1500 to store a threshold (THR (sec)) of a timer value, an estimation section 1200 to estimate a future bandwidth (bps) and a future packet rate (pps) for each importance degree based on the measured bandwidth (bps) and the measured packet rate (pps), a history table 700, a performance determination section 1300 to determine the performance of the packet receiving circuit 230 and the input side header processing unit 221 based on the estimated bandwidth (bps) and packet rate (pps) for each importance degree, and a policy storage for performance judgement 500.

Figure 9:
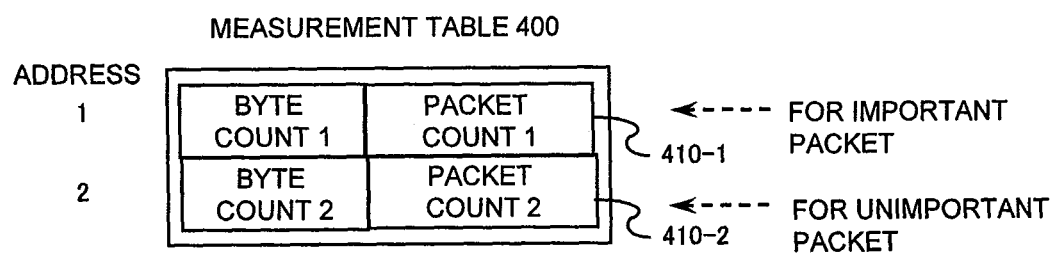
FIG. 9 is a view showing a format of a measurement table.

FIG. 9 shows an example of the measurement table 400.

The table 400 includes an entry 410 for storing the number of received bytes and the number of received packets for each importance degree. When receiving the packet length information 29, the measuring section 1100 reads the entry 410 corresponding to the importance 334 of the received information 29 from the measurement table 400, adds the value of the packet length 316 to the byte count, adds 1 to the packet count, and writes them in the measurement table 400.

Besides, when the value of the timer 1400 exceeds the threshold of the threshold storage 1500, the measuring section 1100 reads values of all the entries 410 of the measurement table 400, notifies the estimation section 1200 of values (here, bps, pps) obtained by dividing them by the threshold THR, and writes "0" in all the entries 410.

The setting of the threshold of the threshold storage 1500 can be performed by the external control terminal 10. When an administrator of the packet forwarding device 200 inputs the threshold to the control terminal 10, the value is transmitted to the processor 290. The processor 290 transmits a writing instruction and the threshold to the measuring section 1100, and the measuring section 1100 writes the received threshold into the threshold storage 1500.

Figure 10:
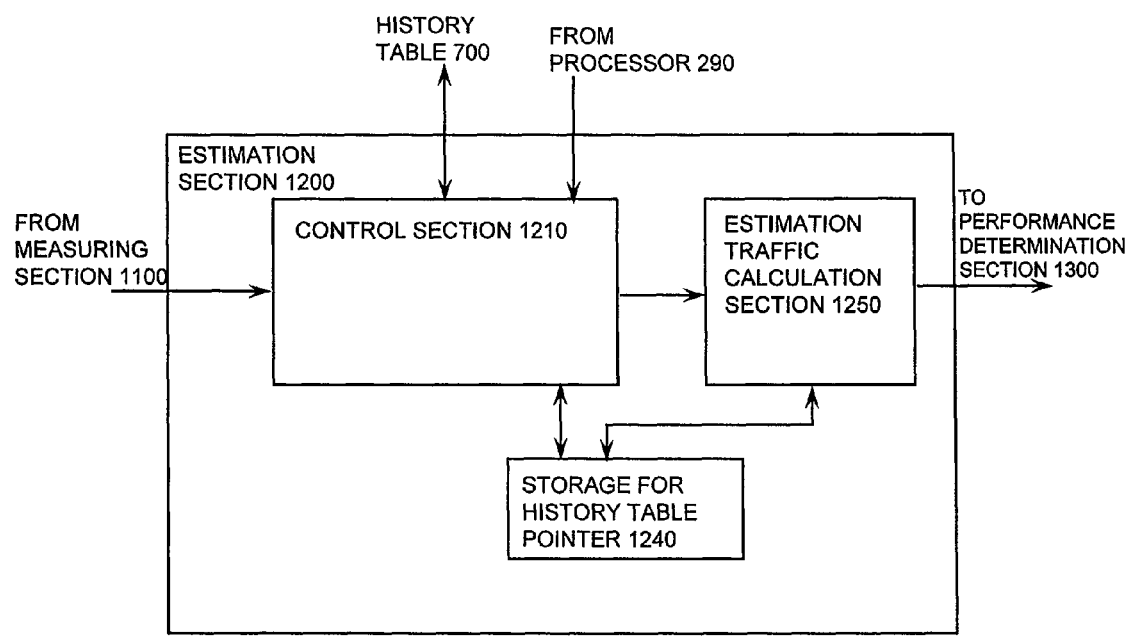
FIG. 10 is a view showing a structure of an estimation section.

FIG. 10 is a detailed structure view of the estimation section 1200.

The estimation section 1200 includes, for example, a control section 1210, a storage for history table pointer 1240 to store a writing address of the history table 700, and an estimation traffic calculation section 1250. Incidentally, the writing address of the history table 700 is initially set to 1 at the time of start of the packet forwarding device 200.

Figure 11:
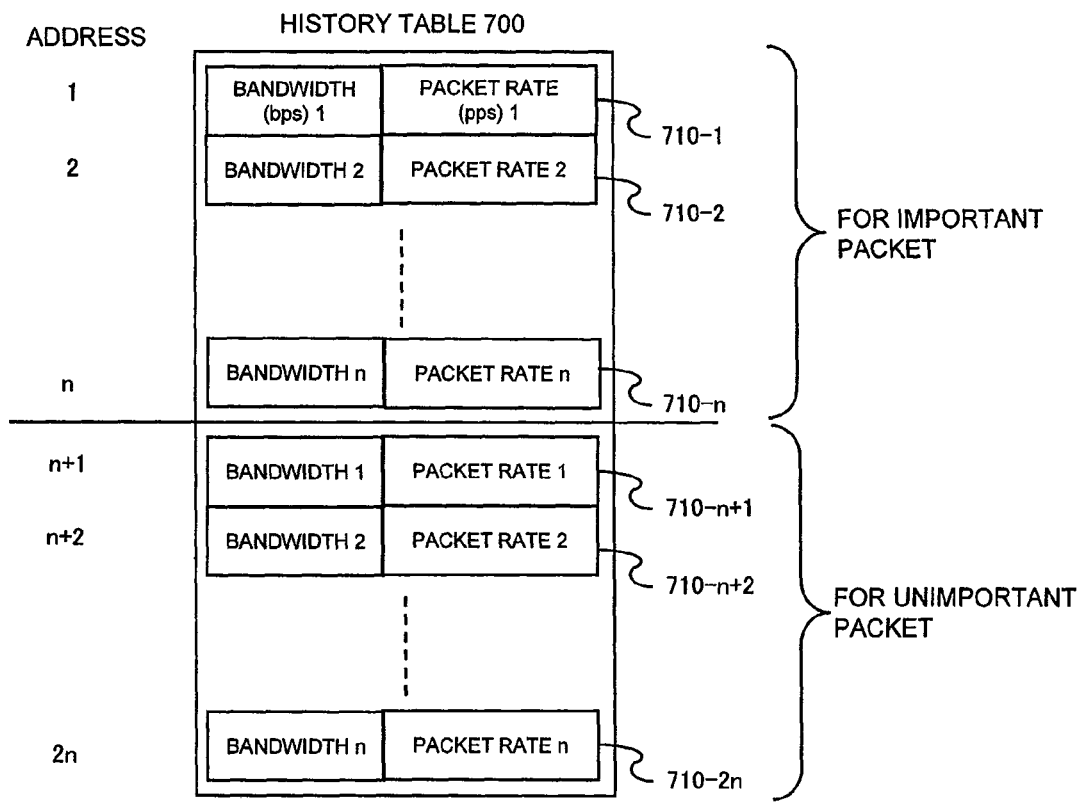
FIG. 11 is a view showing a format of a history table.

FIG. 11 shows an example of a structure of the history table 700.

The table 700 includes n entries 710-1 to 710-2n (710) in each of which a bandwidth (bps) and a packet rate (pps) are written for each importance degree. The control section 1210 writes the information of the bandwidth (bps) and the packet rate (pps) of the important packet transmitted by the measuring section 1100 into the entry 710 corresponding to the writing address, and writes the information of the bandwidth (bps) and the packet rate (pps) of the unimportant packet into the entry 710 corresponding to a value obtained by adding n to the writing address. Further, 1 is added to the writing address, and when the value after the addition is n or less, that value is made the writing address, and when it becomes n+1, 1 is made the writing address, and the writing address is reset in the storage for history table pointer 1240. The control section 1210 performs the resetting operation and the writing in accordance with the address, so that n pieces of newest information in the information of the bandwidth (bps) and the packet rate (pps) can be stored in the table 700.

Next, when the writing process is ended, the control section 1210 reads all the entries 710 from the history table 700, and transmits them to the estimation traffic calculation section 1250. Based on the received information, the calculation section 1250 calculates the bandwidth of the packet received by the packet receiving circuit 230 in a period between a time α seconds after the present time (=time when the newest entry 710 is written) and a time (THR+α) seconds after the present time and the packet rate (pps) for each importance degree. Here, α is the time required for the packet receiving circuit 230, the packet transmission circuit 270 and the header processing unit 220 to actually change the performance from the notification of the performance.

Figure 12:
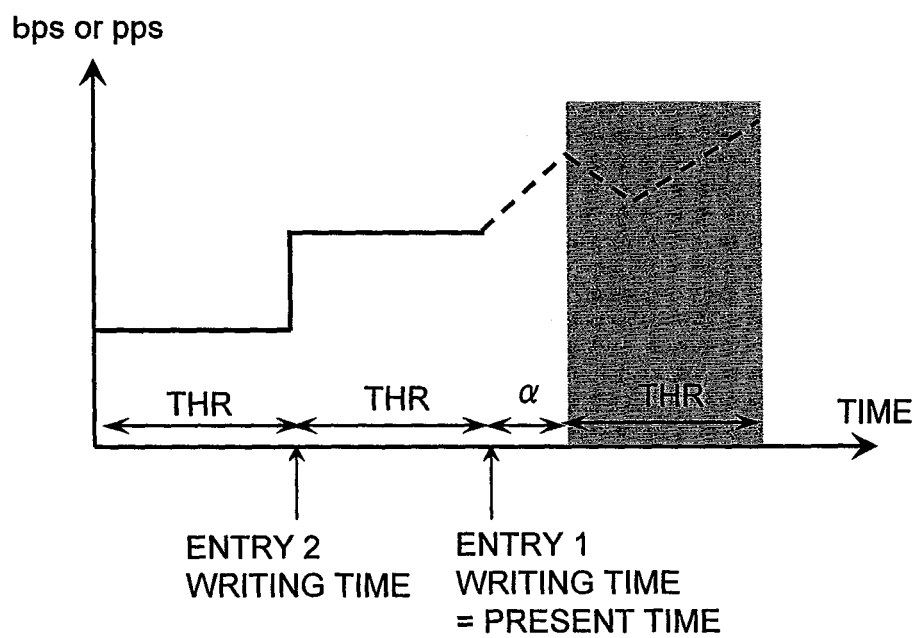
FIG. 12 is a view showing a time range of an estimated bandwidth or packet rate.

FIG. 12 is a view showing the positioning of the calculation. Incidentally, here, the newest entry 710 written at the present time is entry 1, and the entry 710 written THR before the entry 1 is entry 2. The entry 1 and the entry 2 correspond to the average bandwidth or the average packet rate from the time when the previous entry is written, and are written by a solid line in FIG. 12. The calculation of the calculation section 1250 is equivalent to the calculation of the average bandwidth or the average packet rate in the time indicated by hatching in FIG. 12.

First, a description will be given of a case where the calculation section 1250 uses two entries 710 corresponding to importance degrees and calculates bandwidth of the respective importance degrees. At this time, it is conceivable that information of the two newest entries 710, which were updated latest in the n entries 710, are used. In the case of the important packet, the two newest entries 710 are the entry 710 (written as entry 1_importance) corresponding to the address obtained by subtracting 1 from the writing address in the storage for history table pointer 1240 and the entry 710 (written as entry 2_importance) corresponding to the address obtained by subtracting 2 therefrom. However, when the subtracted addresses become 0 and −1, the entries 710 correspond to the address n and the address n−1. Incidentally, the bandwidth (bps) in the entry i_importance (i=1 or 2) and the packet rate (pps) are respectively written as bandwidth i_importance and packet rate i_importance. On the other hand, in the case of the unimportant packet, the entries 710 (written as entry 1_unimportance and entry 2_unimportance) correspond to an address obtained by adding n to a value obtained by subtracting 1 from the writing address and an address obtained by adding n to a value obtained by subtracting 2 therefrom. When the subtracted addresses become n and n−1, the entries 710 correspond to addresses 2n and 2n−1. Incidentally, the bandwidth (bps) and the packet rate (pps) in the entry i_unimportance (i=1 or 2) are respectively written as bandwidth i_unimportance and packet rate i_unimportance.

These pieces of information are used, and the estimated bandwidth and packet rate of an important packet and an unimportant packet in the period between a time α seconds after the time when the entry 1 is written and a time (THR+α) seconds after the time are calculated as described below.

Estimated bandwidth (bps) of important packet=
(bandwidth 1_importance−bandwidth 2_importance)(THR+α)/THR+bandwidth 1_importance   expression 1

Estimated packet rate (pps) of important packet=
(packet rate 1_importance−packet rate 2_importance)(THR+α)/THR+packet rate 1_importance   expression 2

Estimated bandwidth (bps) of unimportant packet=
(bandwidth 1_unimportance−bandwidth 2_unimportance)(THR+α)/THR+bandwidth 1_unimportance   expression 3

Estimated packet rate (pps) of unimportant packet=
(packet rate 1_unimportance−packet rate 2_unimportance)(THR+α)/THR+packet rate 1_unimportance   expression 4

As an example, in this calculation, it is considered that the increase or decrease of the bandwidth (bps) or the packet rate (pps) during THR as the time difference in which two entries 710 are stored is proportional to the time elapsed from the time when the newest entry 710 was stored and continues until (THR+α) seconds elapses.

Next, a description will be given of a case where all n entries 710 are used to estimate a bandwidth and a packet rate in a period between a time a seconds after the present time and a time (THR+α) seconds thereafter. At this time, the bandwidth i_importance and the packet rate i_importance as the bandwidth (bps) and the packet rate (pps) of the entry importance (i=1 to n), and the bandwidth i_unimportance and the packet rate i_unimportance as the bandwidth (bps) and the packet rate (pps) of the entry i_unimportance (i=1 to n) are used, and for example, the calculation is performed as follows. Incidentally, here, i and n are positive integers, and denote the sequence in which the entry 710 is stored in the table 700.

Estimated bandwidth (bps) of important packet=Σ
((bandwidth $i$_importance−bandwidth$(i+1)$_importance)×2$(n-i)/(n+1)n$×(THR+α)/THR)+bandwidth 1_importance   expression 5

Estimated bandwidth (bps) of unimportant packet=Σ
((bandwidth $i$_unimportance−bandwidth$(i+1)$_unimportance)×2$(n-i)/(n+1)n$×(THR+α)/THR)+bandwidth 1_unimportance   expression 6

Estimated packet rate (pps) of important packet=Σ
((packet rate $i$_importance−packet rate$(i+1)$_importance)×2$(n-i)/(n+1)n$×(THR+α)/THR)+bandwidth 1_importance   expression 7

Estimated packet rate (pps) of unimportant packet=Σ
((packet rate $i$_unimportance−packet rate $(i+1)$_unimportance)×2$(n-i)/(n+1)n$×(THR+α)/THR)+packet rate 1_unimportance   expression 8

Where, Σ denotes the total sum of terms multiplied when i is changed from 1 to n−1.

In the calculation of the expressions 5 to 8, the increase or decrease of the entry i and the entry i+1 are weighted by n−i, so that the latest increase or decrease is much weighted.

The estimation traffic calculation section 1250 transmits the bandwidth and the packet rate for each importance degree calculated in accordance with the foregoing expressions to the performance determination section 1300.

Figure 13:
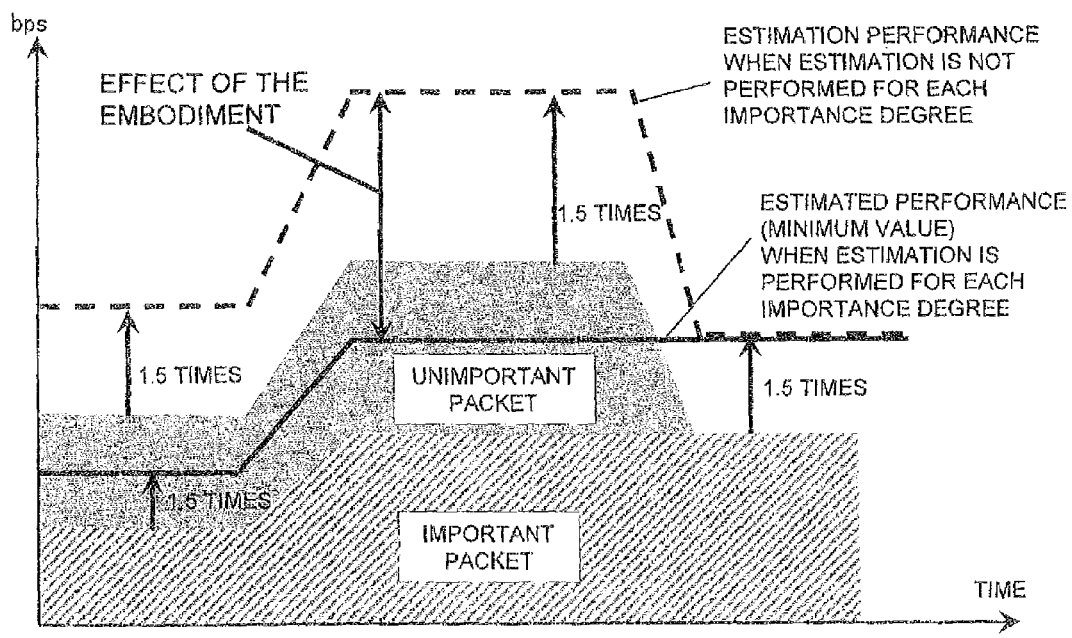
FIG. 13 is a view showing an effect of the invention.

When receiving the estimated bandwidth and the packet rate, the performance determination section 1300 calculates the performance in accordance with the calculation method stored in the policy storage for performance judgement 500. The calculation of the performance determination section 1300 will be described by use of FIG. 13. FIG. 13 is a graph showing a time change of the bandwidth (bps) of the estimated traffic or the performance (bps) determined based on the bandwidth. An oblique line part represents the estimated bandwidth of an important packet, and a hatching part represents the estimated bandwidth of an unimportant packet. Here, it is assumed that when the maximum bandwidth of the bandwidth of the important packet is 1.5 times higher than the estimated bandwidth and the performance is ensured, the communication quality concerning the delay of the important packet, the packet discard ratio and the like is ensured. At this time, the redundantly necessary bandwidth (in this case, the bandwidth 0.5 times higher than the estimated bandwidth) is the amount determined dependently on fluctuation (dispersion) of the estimated traffic amount. When the bandwidth is not estimated for each importance degree, and the total bandwidth (bps) of the important packet and the unimportant packet is estimated, the bandwidth of the important packet in the total bandwidth becomes unclear. Thus, in order to ensure the communication quality of the important packet, it is necessary to estimate the performance on the assumption that all of the total bandwidth is the bandwidth of the important packet. That is, the bandwidth 1.5 times higher than the total of the important packet and the unimportant packet is calculated to be the estimated performance (indicated by a broken line in FIG. 13).

On the other hand, in the estimation section 1200 of this embodiment, the bandwidth of the individual important packet is estimated. Besides, in the PB access circuit 233 of the packet receiving circuit 230, and the PB access circuit 273 of the packet transmission circuit 270, the process of the important packet is preferentially executed. Thus, in order to ensure the communication quality of the important packet, it is sufficient if the performance determination section 1300 determines that the estimated performance is 1.5 times higher than the estimated bandwidth of the important packet. This performance is preferentially assigned to the important packet by the PB access circuits 233 and 273.

The writing bandwidth from the PB access circuit 233 to the input side packet buffer 240 is preferentially assigned to the important packet, and this assignment is realized in such a way that the packet receiving circuit 230 includes the queue 236 for important packets and the queue 237 for unimportant packets, and the PB access circuit 233 preferentially writes the packet from the queue 236 to the input side packet buffer 240. Besides, with respect to the bandwidth read by the PB access circuit 233 from the input side packet buffer 240, preferential assignment is realized in such a way that the PB access circuit 233 manages also the sequence of packets in which the output line number and the QoS information 333 are written for each importance degree, and reads the packet earliest in the sequence among the packets having the higher importance degree.

On the other hand, the writing bandwidth from the PB access circuit 273 to the output side packet buffer 280 is preferentially assigned to the important packet, and this preferential assignment is realized in such a way that the packet transmission circuit 270 includes the queue 271 for important packets and the queue 272 for unimportant packets, and the PB access circuit 273 preferentially writes the packet from the queue 271 to the output side packet buffer 280. Besides, with respect to the bandwidth read from the PB access circuit 273, preferential assignment is realized in such a way that the PB access circuit 273 manages the sequence of packets in which the QoS information 333 is written for each importance degree, and reads the packet earliest in the sequence among the packets having the higher importance degree.

As stated above, as compared with the case where the performance is estimated based on the total bandwidth, the traffic estimation/performance determination section 100 of this embodiment can estimate the performance to be smaller by the amount 1.5 times the estimated traffic of the unimportant packet (see FIG. 13). Thus, as compared with the case where the performance is determined based on the total bandwidth, the packet forwarding device 200 including the traffic estimation/performance determination section 100 of this embodiment can suppress the power consumption to be low while keeping the communication quality of the important packet.

In the above, although the estimated performance is determined to be 1.5 times higher than the important packet, the performance may be determined to be 1.5 or more (or less) times higher. When the estimated performance is set to be 1.5 times higher than the estimated bandwidth of the important packet, and when the important packet is inputted for a long time in the bandwidth 1.5 times higher than the estimated bandwidth, it is conceivable that the output destination determination process and the flow process of the unimportant packet are not performed, and the unimportant packet is not transferred. When the estimated performance is set to be 1.5 or more times higher than the estimated bandwidth, the transfer of the unimportant packet can be ensured to a certain degree. For example, calculation is performed based on the following expression. This calculation expression is set in the policy storage for performance judgement 500 via the processor 290 from the control terminal 10. At the time of the calculation, the determination section 1300 reads the information of the storage unit 500 and performs the calculation.

Performance (bps)=estimated bandwidth (bps) of important packet×1.5+estimated bandwidth (bps) of unimportant packet×1.0    expression 9

In the expression 9, the bandwidth 1.0 times higher than the bandwidth (bps) of the unimportant packet is added. When the bandwidth of the important packet does not become higher than 1.5 times the estimated bandwidth of the important packet, the bandwidth of the estimated bandwidth of the unimportant packet is ensured as the bandwidth for the unimportant packet.

In general, the bandwidth of the unimportant packet is higher than that of the important packet, and when the estimated performance for the unimportant packet is made high, there is a high possibility that waste occurs. Further, in order to ensure the communication quality completely, there is a case where the performance for the estimated bandwidth must be made extremely high in order to deal with an abrupt bandwidth increase. In this example, although the extra performance of the bandwidth 0.5 times higher is considered, it is conceivable that the performance becomes even higher. Thus, when the bandwidth of the unimportant bandwidth is ensured, the performance is not made 1.5 times higher than the estimated bandwidth of the unimportant packet, but it is desirable that the magnification is made 1.0 times or its vicinity. In order to perform the performance determination as stated above, it is also necessary to estimate the bandwidth of the unimportant packet.

In the above, although the bandwidth (bps) is considered, the same applies to the packet rate (pps). The performance determination section 1300 of the input side traffic estimation/performance determination section 1000 determines that the performance of the input side header processing unit 221 is 1.5 times higher than the estimated packet rate (pps) of the important packet, and the performance determination section 1300 of the output side traffic estimation/performance determination section 2000 determines that the performance of the output side header processing unit 222 is 1.5 times higher than the estimated packet rate (pps) of the important packet.

This is because, the input side header processing unit 221 and the output side header processing unit 222 include the queue for important packets and the queue for unimportant packets, and preferentially perform the output destination determination process and the flow process of the packet of the queue for important packets, and accordingly, the packet rate 1.5 times higher than the estimated packet rate (pps) can be certainly assigned to the important packet. Incidentally, the details of the input side header processing unit 221 and the output side header processing unit 222 will be described later.

Figure 19:
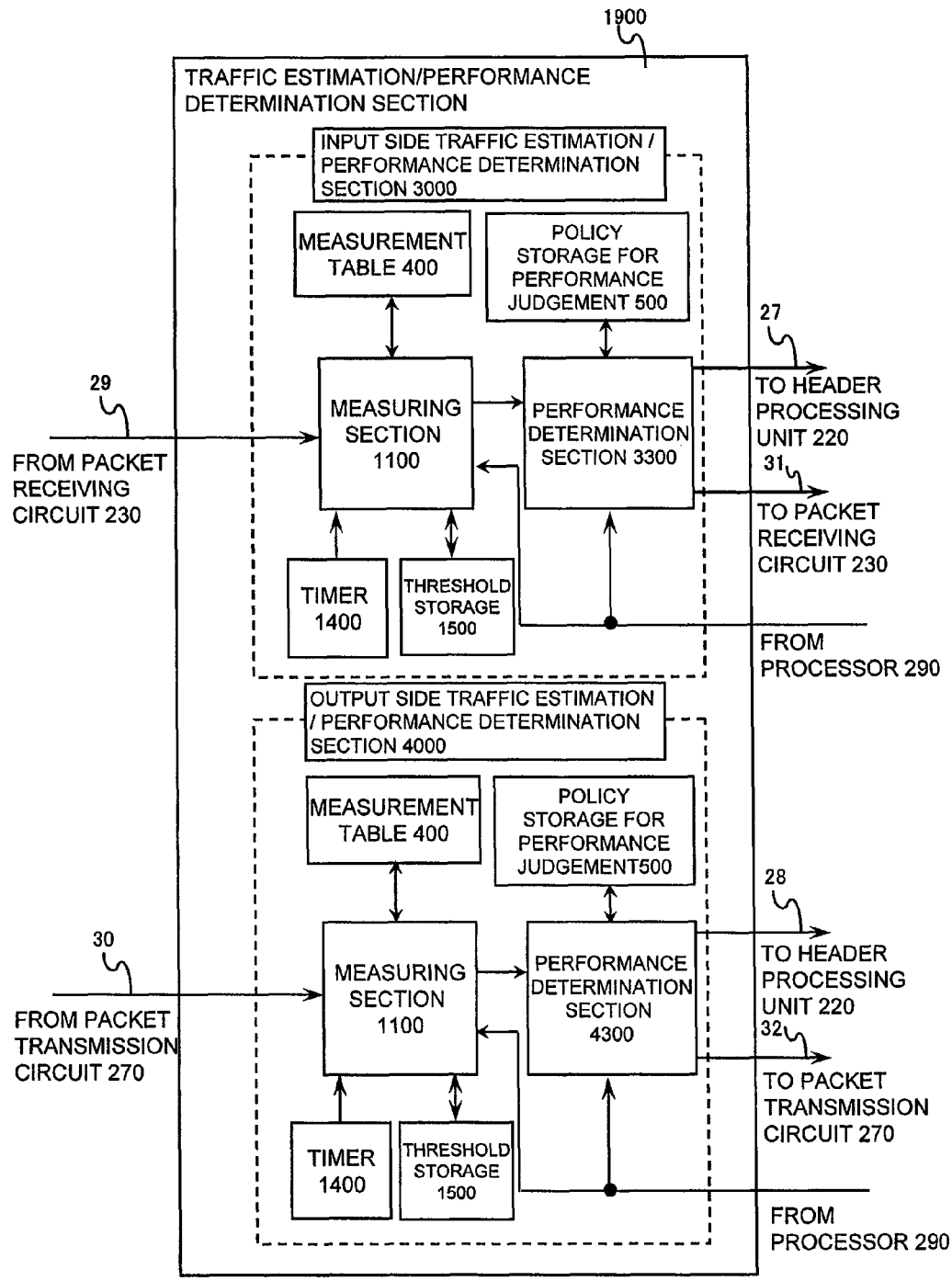
FIG. 19 is a view showing a structure of a traffic estimation/performance determination section.

FIG. 19 is a structural view of another traffic estimation/performance determination section 1900 to perform a performance determination. The determination section 1900 directly determines performance from a measured bandwidth and packet rate.

The determination section 1900 includes an input side traffic estimation/performance determination section 3000 and an output side traffic estimation/performance determination section 4000. As compared with the foregoing determination sections 1000 and 2000, each of the determination sections 3000 and 4000 does not include the estimation section 1200 and the history table 700.

Thus, a performance determination section 3300 directly determines the performance from the measured bandwidth and packet rate outputted at intervals of THR, not the estimated bandwidth and packet rate. For example, the performance determination section 3300 determines the performance based on following expressions. Incidentally, the expressions are stored in a policy storage for performance judgement 500.

Performance (bps)=bandwidth of important packet× 1.5+bandwidth of unimportant packet×1.0    expression 10

Packet performance (bps)=packet rate of important packet×1.5+packet rate of unimportant packet× 1.0    expression 11

As compared with the foregoing performance determination section 100, since the traffic estimation/performance determination section 1900 does not require the history table 700 and the estimation section 1200 for estimating the bandwidth and the packet rate, low-cost mounting is possible. Incidentally, the bandwidth of the unimportant packet may be multiplied by a second magnification, as well as 1.0, smaller than a first magnification multiplied to the important packet.

Here, consideration is given to the traffic estimation/performance determination section 100 in the case where the interface unit 210-1 of the packet forwarding device of FIG. 2 includes the packet receiving circuit 230 and the packet transmission circuit 270 for each of the input lines 201 and the output lines 202. At this time, it is assumed that the plural (four in the example of FIG. 2) packet receiving circuits 230 and the plural packet transmission circuits 270 transmit the packet length information 29 and 30 to the one determination section 100, and the determination section 100 sends the performance to the plural (four) packet receiving circuits 230 and the plural packet transmission circuits 270.

The determination section 100 determines the performance for each of the four packet receiving circuits 230 and the four packet transmission circuits 270. At this time, the measurement table 400 of the input side traffic estimation/performance determination section 1000 includes the byte count and the packet count for each input line 201 and each importance degree shown in FIG. 20. The measuring section 1100 updates the byte count and the packet count of the corresponding input line 201 based on the input line number 331 of the header length information 29. Besides, when the value of the timer 1400 exceeds the threshold of the storage 1500, all entries 410 are read and are transmitted to the estimation section 1200. The history table 700 of the estimation section 1200 includes n entries each containing the byte count and the packet count for each input line 201 and each importance degree, and the estimation section 1200 updates the history table 700 based on the received information of the measurement table 400. Further, the estimation section 1200 transmits all information of the history table 700 to the performance determination section 1300, and the determination section 1300 determines the performance for each input line 201 and sends it to the corresponding packet receiving circuit 230. Each of the four packet receiving circuits 230 to which the performance was sent increases or decreases the performance based on the sent performance. Incidentally, the structure and operation of the output side traffic estimation/performance determination section 4000 is the same except that the input line 201 becomes the output line 202.

As stated above, when the unit of increase or decrease of the performance becomes, for example, each input line or each output line and becomes smaller, the determination section 100 determines the performance and the packet performance in each unit.

Figure 8:
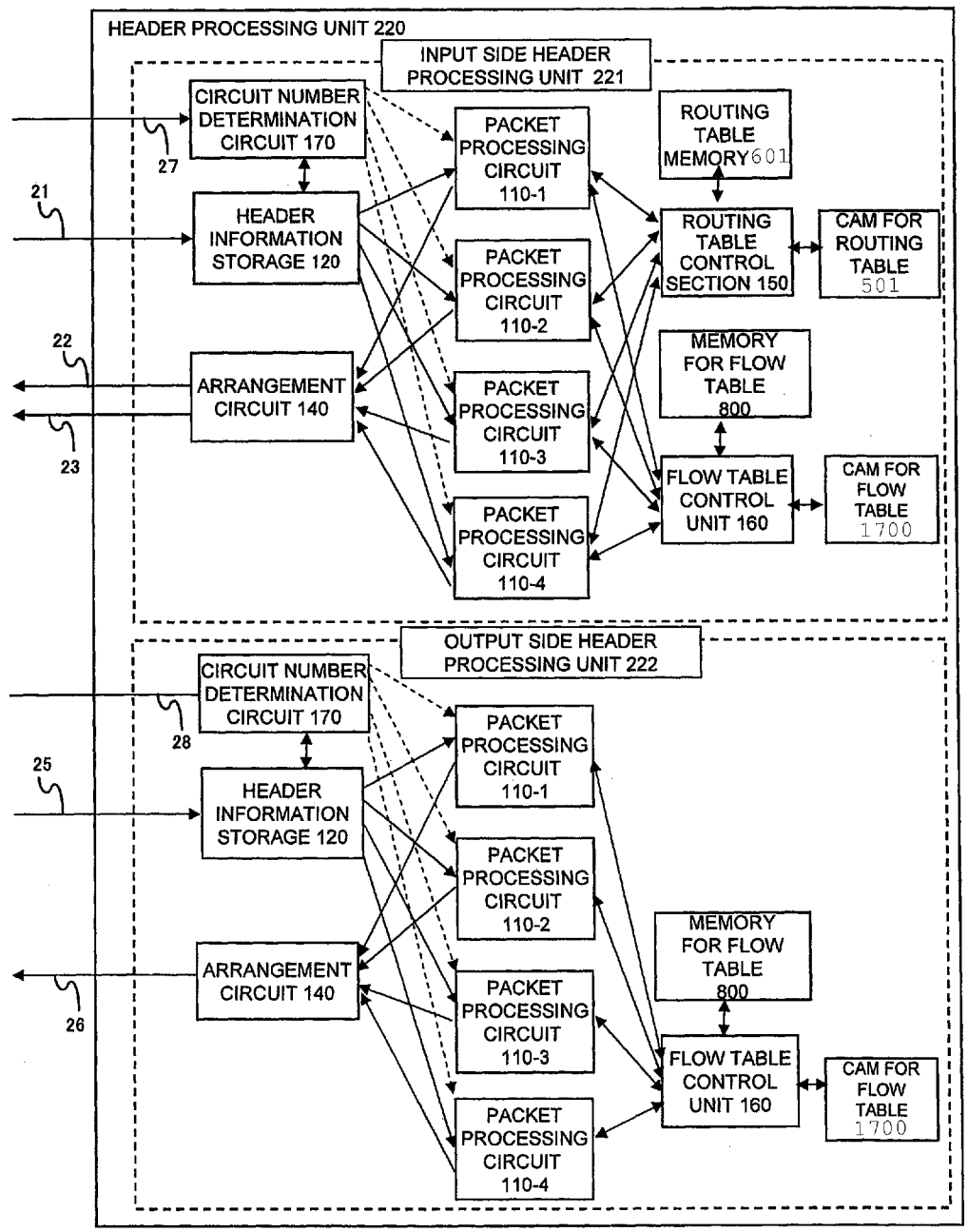
FIG. 8 is a view showing a structure of a header processing section.

FIG. 8 is a detailed operation explanatory view of an example of the header processing unit 220.

The header processing unit 220 includes the input side header processing unit 221 to perform a packet process based on the header information 21 sent by the packet receiving circuit 230, and the output side header processing unit 222 to perform a packet process based on the header information 25 sent by the packet transmission circuit 270.

The input side header processing unit 221 includes a CAM (Content Addressable Memory) for routing table 501 necessary for the output destination determination process, a routing table memory 601, a CAM for flow table 1700 necessary for the flow process, a memory for flow table 800, plural (for example, four) packet processing circuits 110-$k$ ($k$=1-4) to access the CAM for routing table 501 and the flow table section 160 and to perform the output destination determination process and the flow process, a routing table control section 150 to access the CAM 501 or the memory 601 in response to the access request to the CAM for routing table 501 or the routing table memory 601 from the packet processing circuit 110-$k$ ($k$=1 to 4), and a flow table control unit 160 to access the CAM 1700 or the memory 800 in response to the access request to the CAM for flow table 1700 or the memory for flow table 800 from the packet processing circuit 110-$k$ ($k$=1 to 4).

Besides, the input side header processing unit 221 further includes a header information storage 120 to store plural pieces of header information 21 and to distribute/transmit the header information 21 to one of the packet processing circuits 110-$k$, and an arrangement circuit 140 to rearrange the destination information, the filter information and the QoS information, which are determined by the packet processing circuit 110-$k$, in the sequence in which the header information 21 corresponding to these pieces of information is inputted, and to output them as the flow information 23. Further, a circuit number determination circuit 170 described later in detail is included.

The output side header processing unit 222 can be made to have the same structure as the input side header processing unit 221 except that the routing table control section 150, the routing table memory 601, and the CAM for routing table 501, which are functional blocks used for the output destination process of the input side header processing unit 221, are not provided. When receiving the header information 25, the output side header processing unit 222 performs the flow process, and transmits the flow information 26 to the packet transmission circuit 270.

When the header information 21 is inputted to the input side header processing unit 221, the header information storage 120 stores it in the queue corresponding to the importance degree and in the sequence of input. The header information storage 120 receives a BUSY signal (not illustrated in FIG. 8) indicating whether the circuit 110-$k$ is performing the packet process from the packet processing circuit 110-$k$, preferentially reads the header information 21 from the queue for important packets, and transmits it to the packet processing circuit 110-$k$ which is not performing the packet process.

Figure 14:
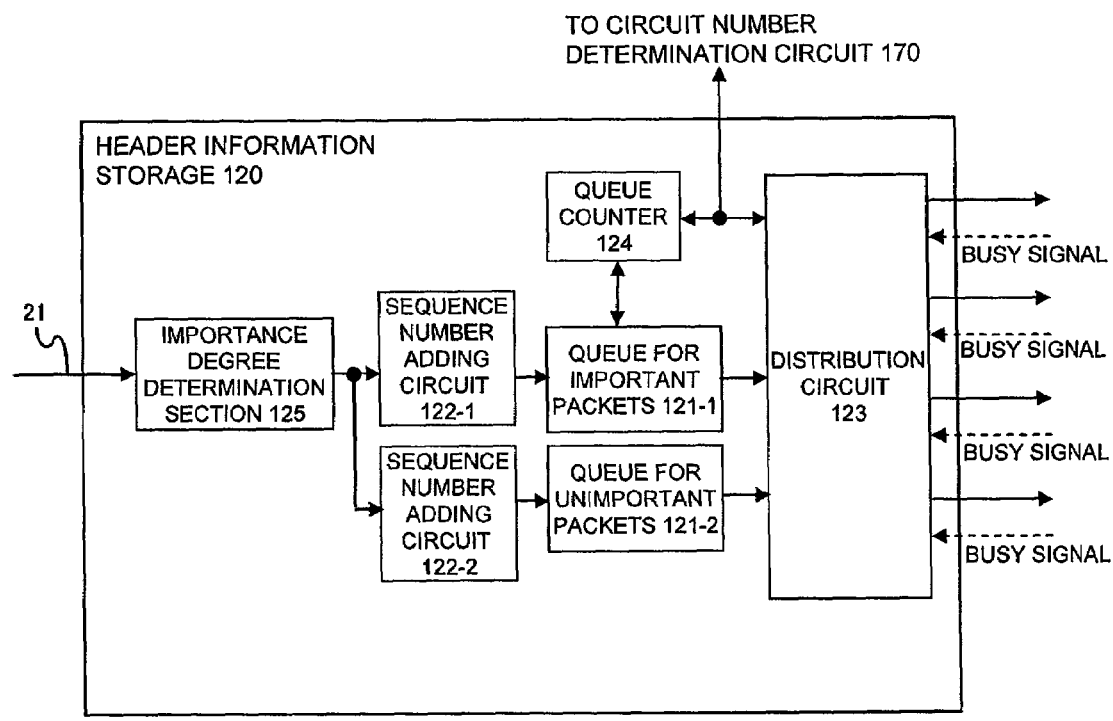
FIG. 14 is a view showing a structure of a header information storage buffer.

FIG. 14 shows a structural example of the header information storage 120.

The buffer 120 shown in FIG. 14 includes an importance degree determination section 125, a sequence number adding circuit 122-1 for important packets, a sequence number adding circuit 122-2 for unimportant packets, a queue 121-1 for important packets, a queue 121-2 for unimportant packets, a distribution circuit 123, and a queue counter 124. When the header information 21 is inputted, the importance degree determination section 125 refers to the importance 334 of the internal header section 330, and transmits it to the corresponding sequence number adding circuit 122-1 or 122-2. The sequence number adding circuit 122-1 or 122-2 includes a counter for each input line, and when the header information 21 is inputted, the sequence number attaching circuit attaches the counter value corresponding to the input line number 331 in the header information 21 to the header information 21, and transmits it to the queue 121-1 or 121-2. At this time, the counter value corresponding to the input line number 331 is counted up by 1. On the other hand, the queue 121-1 or 121-2 stores the received header information 21. The distribution circuit 123 receives the BUSY signal from the packet processing circuit 110-$k$, and receives the number of the packet processing circuits 110-$k$ to be operated from the circuit number determination circuit 170. For example, when the number of circuits to be operated is 1, only the packet processing circuit 110-1 operates, when it is 2, the processing circuits 110-1 and 110-2 operate, when it is 3, the processing circuits 110-1, 110-2 and 110-3 operate, and when it is 4, all the processing circuits 110-1 to 110-4 operate. When one or more packet processing circuits 110-$k$ exist which are the packet processing circuits 110-$k$ under operation and do not transmit the BUSY signal, the distribution circuit 123 transmits the header information 21 first stored in the queue 121-1 for important packets to the packet processing circuit 110-$k$, and when the header information 21 is not stored in the queue 121-1 for important packets, the distribution circuit transmits the header information 21 first stored in the queue 121-2 for unimportant packets to the packet processing circuit 110-$k$.

<Output Destination Determination Process>

The packet processing circuit 110-$k$ transmits the DIP 312 and the routing table retrieval request to the routing table control section 150 and starts the output destination determination process. When receiving the DIP 312 and the request, the routing table control section 150 transmits the DIP 312 as the retrieval key to the CAM for routing table 501.

When the requests are received from the plural packet processing circuits 110-$k$, in order to select one of the requests, the routing table control section 150 includes a counter countable from 1 to 4. The counter value is reset to, for example, 1 simultaneously with the start of the packet forwarding device 200. When the requests are received from the plural packet processing circuits 110-$k$, and when the counter value is A, the routing table control section 150 selects the request of the packet processing circuit 110-A. When there is no request, the presence or absence of the request is confirmed in the sequence of the packet processing circuit 110-(A+1), the packet processing circuit 110-(A+2) and the like, and when the request exists, the request is selected. When the presence or absence of the packet processing circuit 110-4 is confirmed and it is determined that there is no corresponding request, return is made to the packet processing circuit 110-1, and thereafter, a search for a request to be selected is performed in the sequence of the packet processing circuit 110-(A+1), the packet processing circuit 110-(A+2) and the like. When selecting the request, the routing table control section 150 transmits, as the retrieval key, the DIP 312 corresponding to the request to the CAM for routing table 501. Further, the counter value is reset to a value "k+1" obtained by adding 1 to the counter value corresponding to the packet processing circuit 110-$k$ which transmitted the request.

Figure 15:
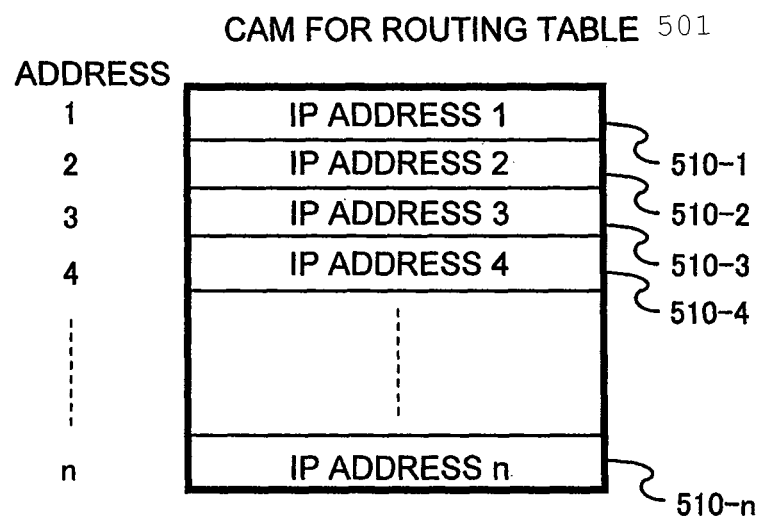
FIG. 15 is a view showing a format of a CAM for routing table.
Figure 16:
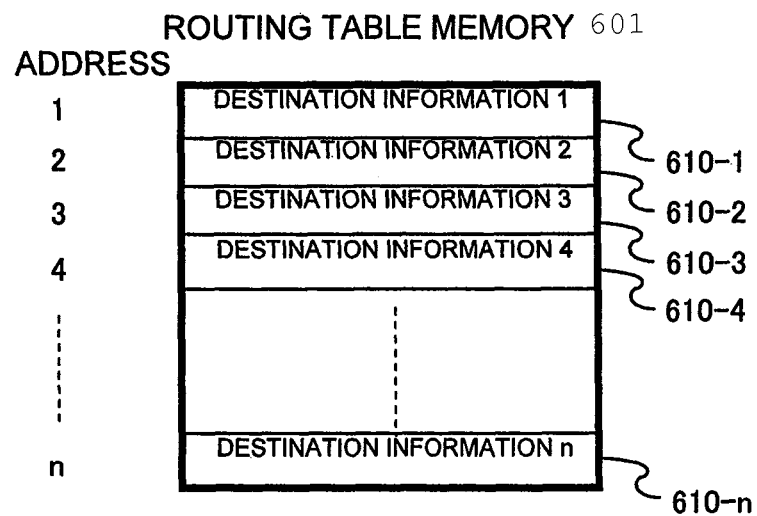
FIG. 16 is a view showing a format of a routing table memory.

FIG. 15 and FIG. 16 show an example of formats of the CAM for routing table 501 and the routing table memory 601 of FIG. 8. The CAM for routing table 501 includes plural entries 510 (510-1 to 510-$n$) expressing conditions of the DIP 312, and the routing table memory 601 stores destination information of a packet including the DIP 312, which is consistent with the condition written in the entry 510, into the entry 610 (610-1 to 610-$n$). The CAM 501 can store the condition of the DIP 312 with a mask (indicating that any value is appropriate).

When receiving the DIP 312, the CAM for routing table 501 compares the value of the DIP 312 with the value of the entry 510, and transmits the smallest address value among the addresses of the consistent entries 510 to the routing table control section 150. The routing table control section 150 transmits the address to the packet processing circuit 110-$k$ which transmitted the request. The packet processing circuit 110-$k$ which received the address value transmits the address value and the read request of the routing table memory 601 to the routing table control section 150.

The selection operation of the request in the routing table control section 150 when the read requests are received from the plural packet processing circuits 110-$k$ is the same as the case where the plural routing table retrieval requests are received. The routing table control section 150 uses the address value corresponding to the selected read request and reads the destination information in the entry 610 of the routing table memory 601, and transmits the information to the packet processing circuit 110-$k$ which transmitted the read request. The destination information is made the output line number, and the packet processing circuit 110-$k$ transmits it, together with the sequence number, to the arrangement circuit 140.

<Flow Process>

In the flow process, the packet processing circuit 110-$k$ transmits the SIP 311, the DIP 312, the SPORT 313, the DPORT 314, the DSCP 315, the SMAC 317, the DMAC 318 and the UPRI 319 in the header information 21, and the flow table retrieval request to the flow table control unit 160, and starts the flow process. When receiving the request, the flow table control unit 160 transmits, for example, the SIP 311, the DIP 312, the SPORT 313, the DPORT 314, the DSCP 315, the SMAC 317, the DMAC 318 and the UPRI 319, as retrieval keys, to the CAM for flow table 1700. Incidentally, the selection operation of the request in the flow table control unit 160 when the requests are received from the plural packet processing circuits 110-$k$ is the same as the operation of the routing table control section 150.

FIG. 17 and FIG. 18 show formats of the CAM for flow table 1700 and the memory for flow table 800.

The CAM for flow table 1700 includes plural entries 1710 (1710-1 to 1710-$n$) each expressing the condition of, for example, the SIP 311, the DIP 312, the SPORT 313, the DPORT 314, the DSCP 315, the SMAC 317, the DMAC 318 and the UPRI 319. The memory for flow table 800 stores the filter information, the QoS information and the counter value of the packet including the SIP 311, the DIP 312, the SPORT 313, the DPORT 314, the DSCP 315, the SMAC 317, the DMAC 318 and the UPRI 319, which are consistent with the condition written in the entry 1710, into the entry 1810 (1810-1 to 1810-$n$). The CAM 1700 can store the condition with a mask (indicating that any value is appropriate).

When receiving the retrieval key, the CAM for flow table 1700 makes a consistency comparison with the entry 1710, and transmits the smallest address value among the addresses of the consistent entries 1710 to the flow table control unit 160. The flow table control unit 160 transmits the address to the packet processing circuit 110-$k$ which transmitted the flow table retrieval request. The packet processing circuit 110-$k$ transmits the address and the read request of the memory for flow table 800 to the flow table control unit 160. The flow table control unit 160 reads the filter information, QoS information, and counter value written in the entry 1810 of the memory for flow table 800 corresponding to the address value, and transmits them to the packet processing circuit 110-$k$ which transmitted the read request. The packet processing circuit 110-$k$ counts up the counter value by 1, and transmits the address value, the counter value, and the writing request to the flow table control unit 160. The flow table control unit 160 writes the received counter value into the entry 1810 of the memory for flow table 800 corresponding to the address. Further, the packet processing circuit 110-$k$ transmits the received filter information and QoS information, together with the sequence number, to the arrangement circuit 140.

The arrangement circuit 140 rearranges the information in the set of the received destination information, filter information, and QoS information in the sequence of the sequence number for each input line and transmits it. This circuit is required because, packets outputted from the header information storage 120 are processed in parallel in the four packet processing circuits 110-$k$, and the sequence of the packets may be exchanged due to a difference in the retrieval times of the respective tables.

Up to here, the operation performed when the input side header processing unit 221 receives the header information 21 is described. When the output side header processing unit 222 receives the header information 25, the header information storage 120 attaches the sequence number to the header information 25 for each output line, and the arrangement circuit 140 makes an arrangement to ensure the sequence of input of the header information 25 for each output line. Further, the packet processing circuit 110-$k$ does not perform the output destination determination process. The other operations are the same as the operations performed when the input side header processing unit 221 receives the header information 21.

In the packet forwarding device 200 including the header processing unit 220 as described above, based on the packet performance information 27 and 28 transmitted by the traffic estimation/performance determination section 100, the input side header processing unit 221 and the output side header processing unit 222 change the number of the packet processing circuits 110-$k$ to be operated. More specifically, the determination of the number of the circuits 110-$k$ to be operated is performed by the circuit number determination circuit 170. Here, the interface unit 210-1 capable of accommodating four lines 1$j$ (j=1 to 4) will be considered. The performance (pps) of the four packet processing circuits 110-$k$ of the interface unit 210-1 is coincident with the maximum value of the packet rate (pps) inputted from the four lines 1$j$.

At this time, the circuit number determination circuit 170 of the input side header processing unit 221 determines that for example, when the packet rate (pps) in the packet performance information 27 is from 0% to 25% of the total of the line bandwidth of the four lines 1$j$, the number of the packet processing circuits 110-$k$ to be used is determined to be one, when it is larger than 25% and not larger than 50%, the determined number is two, when it is larger than 50% and not larger than 75%, the determined number is three, and when it is larger than 75%, the determined number is four. With respect to the remaining packet processing circuit 110-$k$, for example, the power source is turned OFF. The circuit number determination circuit 170 of the output side header processing unit 222 performs the same determination on the packet rate (pps) in the packet performance information 28. Incidentally, in addition to the limitation of the number of the packet processing circuits to be used, the clock number of the packet processing circuit is reduced similarly to the above, and the power consumption may be reduced.

Although the description is mainly given to the input side, the same applies to the output side.

The present invention can be used for, for example, the packet forwarding device to transfer a packet.

What is claimed is:

1. A packet forwarding device which comprises a plurality of input lines and a plurality of output lines, and transfers a packet inputted from the input line to one or more of the output lines, the packet forwarding device comprises: a packet transfer processing section which includes a header processing section, a receiving circuit to receive the packet via one of the input lines, and a packet transmission circuit to send the packet via one of the output lines; an importance degree determination section to determine an importance degree of the packet from header information of the packet; a measuring section to measure an amount of packets reaching the packet transfer processing section for each packet importance degree; and a performance determination section to determine packet processing performance of at least one of the header processing section, the receiving circuit, and the packet transmission circuit based on the measured amount of packets for each importance degree, the packet processing performance being a capacity of processing for entire packets to be processed having different importance degrees, and packets being discarded or delayed when the amount of packets exceeds the packet processing performance, and to change processing performance of at least one of the header processing section, the receiving circuit, and the packet transmission circuit according to the determined packet processing performance; wherein the performance determination section obtains a first estimated bandwidth based on the amount of packets of a first importance degree, and a second estimated bandwidth based on the amount of packets of a second importance degree lower than the first importance degree, and wherein the packet processing performance is a result obtained by multiplying the first estimated bandwidth by a first magnification to prevent the packet of the first importance degree from being discarded and by adding the multiplying result to the second estimated bandwidth, or a result obtained by adding a value obtained by multiplying the first estimated bandwidth by the first magnification and a value obtained by multiplying the second estimated bandwidth by a second magnification smaller than the first magnification.

2. The packet forwarding device according to claim 1, wherein the measuring section measures the number of packets per unit time as the amount of packets, and the performance determination section determines, as the packet processing performance, the number of packets per unit time estimated based on the number of packets.

3. The packet forwarding device according to claim 1, wherein the header processing section performs one or more of a determination process of an output line to transfer the packet based on the header information, a determination process of presence or absence of transfer of the packet, a determination process of transfer priority of the packet, and a collection process of statistical information of a flow to which the packet belongs.

4. The packet forwarding device according to claim 3, wherein
the header processing section includes queues for each importance degree to store the header information, and
the header processing section preferentially performs a process for the header information stored in the queue having a higher importance degree.

5. The packet forwarding device according to claim 3, wherein the header processing section changes a clock frequency according to the determined packet processing performance, thereby the packet processing performance of the header processing section is changed.

6. The packet forwarding device according to claim 3, wherein the header processing section includes
a plurality of packet processing circuits, and
a circuit number determination circuit to determine the number of packet processing circuits to be used among the plurality of packet processing circuits according to the determined packet processing performance.

7. The packet forwarding device according to claim 6, wherein a power source of the packet processing circuit not used is turned off.

8. The packet forwarding device according to claim 1, wherein
the measuring section measures the number of bytes per unit time as the amount of packets, and
the performance determination section determines, as the packet processing performance, the number of bytes per unit time estimated based on the number of bytes.

9. The packet forwarding device according to claim 8, wherein the packet transfer section includes
a packet buffer to store the packet, and
a packet buffer access circuit to write the inputted packet into the packet buffer and to read the packet from the packet buffer.

10. The packet forwarding device according to claim 9, wherein the packet transfer processing section further includes queues for each importance degree to store the packet, and the packet buffer access circuit preferentially reads the packet stored in the queue having a higher importance degree and to write the packet into the packet buffer.

11. The packet forwarding device according to claim 9, wherein the packet buffer access circuit changes a clock frequency according to the determined packet processing performance, thereby the packet buffer access circuit changes read and write performance to the packet buffer.

12. The packet forwarding device according to claim 1, wherein the measuring section measures the amount of packets for each input line and each importance degree, and the performance determination section determines, based on the measured amount of packets, the packet processing performance to be requested to the packet transfer processing section for each input line.

13. The packet forwarding device according to claim 1, wherein the measuring section measures the amount of packets for each output line and each importance degree, and the performance determination section determines, based on the measured amount of packets, the packet processing performance requested to the packet transfer processing section for each output line.

14. The packet forwarding device according to claim 1, wherein the packet processing performance is a result obtained by multiplying the first estimated bandwidth by the first magnification to prevent the packet of the first importance degree from being discarded, wherein the packet forwarding device further comprises a history storage area to store a history of the amount of packets for each importance degree, which is measured plural times by the measuring section, and wherein the estimation section obtains the first estimated bandwidth based on a plurality of amounts of packets of the first importance degree stored in the history storage area.

15. The packet forwarding device according to claim 14, wherein the estimation section weights the plurality of amounts of packets according to measured timing and obtains the first estimated bandwidth.

16. The packet forwarding device according to claim 1, wherein the packet transfer processing section performs a packet transfer processing based on the importance degrees of the packets and changed processing performance.

* * * * *